United States Patent [19]

Bushman et al.

[11] Patent Number: 4,467,274

[45] Date of Patent: Aug. 21, 1984

[54] ELECTRICAL SURVEYS OF UNDERWATER OR UNDERGROUND STRUCTURES WITH ELECTRODE-TO-ELECTROLYTE POTENTIAL CORRECTION

[75] Inventors: James B. Bushman, Medina, Ohio; Clark P. Weldon; Stephen L. Wolfson, both of Houston, Tex.

[73] Assignee: Harco Corporation, Medina, Ohio

[21] Appl. No.: 264,200

[22] Filed: May 15, 1981

[51] Int. Cl.³ .................. G01V 3/08; G01V 3/15; G01R 31/02

[52] U.S. Cl. .................................. 324/71.1; 324/72; 324/348

[58] Field of Search ......... 324/71.1, 72, 323, 347–349, 324/357, 360, 361, 52, 54, 425

[56] References Cited

U.S. PATENT DOCUMENTS

| | | | |
|---|---|---|---|
| 2,974,276 | 3/1961 | Davis | 324/348 X |
| 2,988,691 | 6/1961 | McAlister et al. | 324/361 X |
| 3,735,249 | 5/1973 | Stoll | 324/348 |
| 4,063,161 | 12/1977 | Pardis | 324/347 X |
| 4,078,510 | 3/1978 | Morgan | 324/72 X |
| 4,151,458 | 4/1979 | Seager | 324/357 |
| 4,365,191 | 12/1982 | Weldon et al. | 324/348 X |

Primary Examiner—Gerard R. Strecker
Attorney, Agent, or Firm—Maky, Renner, Otto & Boisselle

[57] ABSTRACT

An electrical survey of buried structures such as underwater or underground pipelines utilizes the steps of connecting one end of an economically disposable wire from a wire supply to the structure, either directly or through a heavier lead, the opposite end being electrically connected to a cell. The cell is moved along the structure together with a wire supply and a meter to obtain periodic measured structure-to-electrolyte potential values. If the wire is accidentally or intentionally disconnected during the survey, a stationary electrode is positioned at the wire break or last valid measured reading, such electrode being reconnected to the free end of the wire from the supply. The survey then continues periodically obtaining electrode-to-cell potential values. A structure-to-electrolyte potential profile is obtained by summing the last valid recorded structure-to-electrolyte potential value with each electrode-to-cell values. The summing may be done after the survey is completed by computer.

28 Claims, 6 Drawing Figures

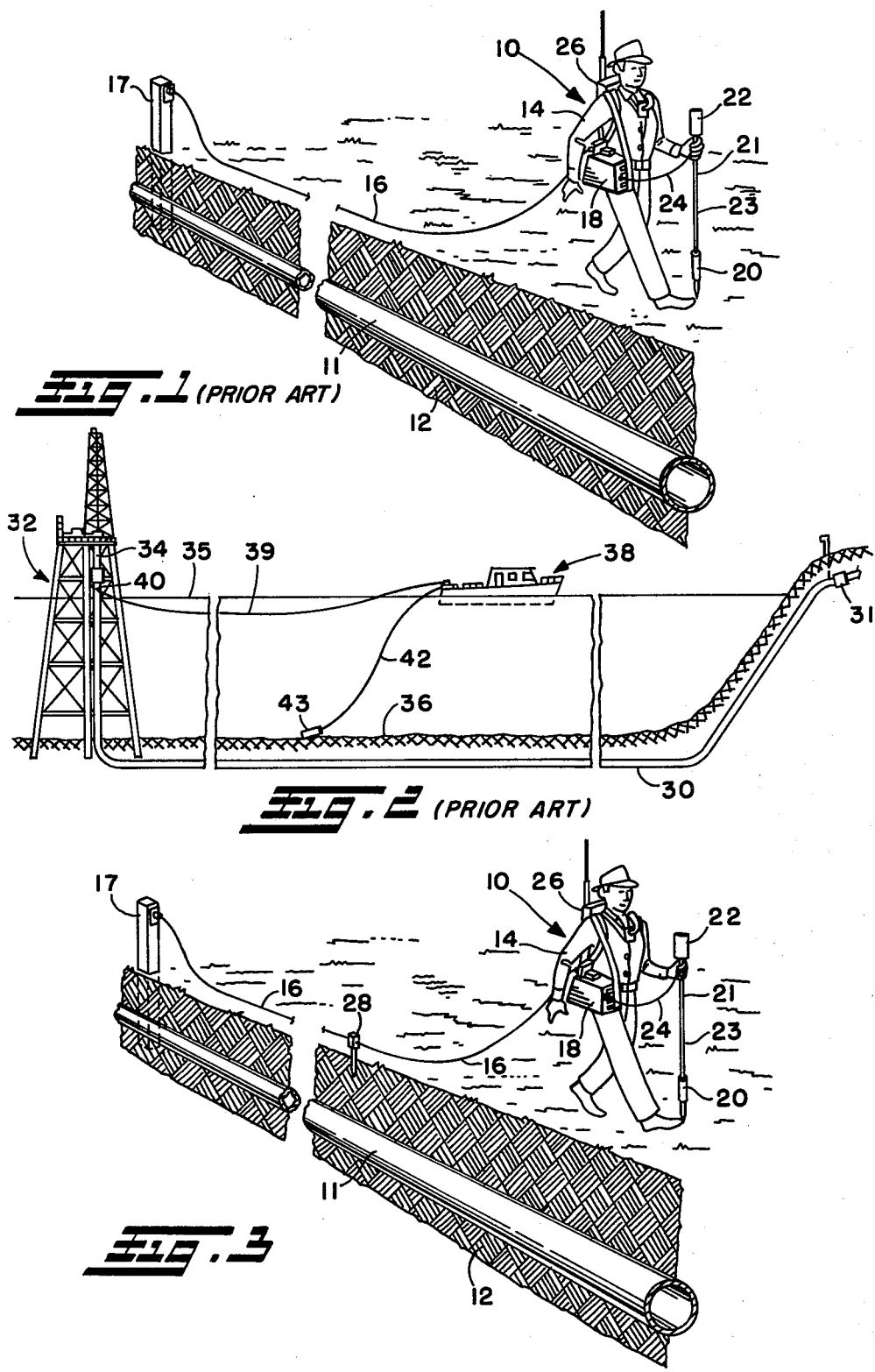

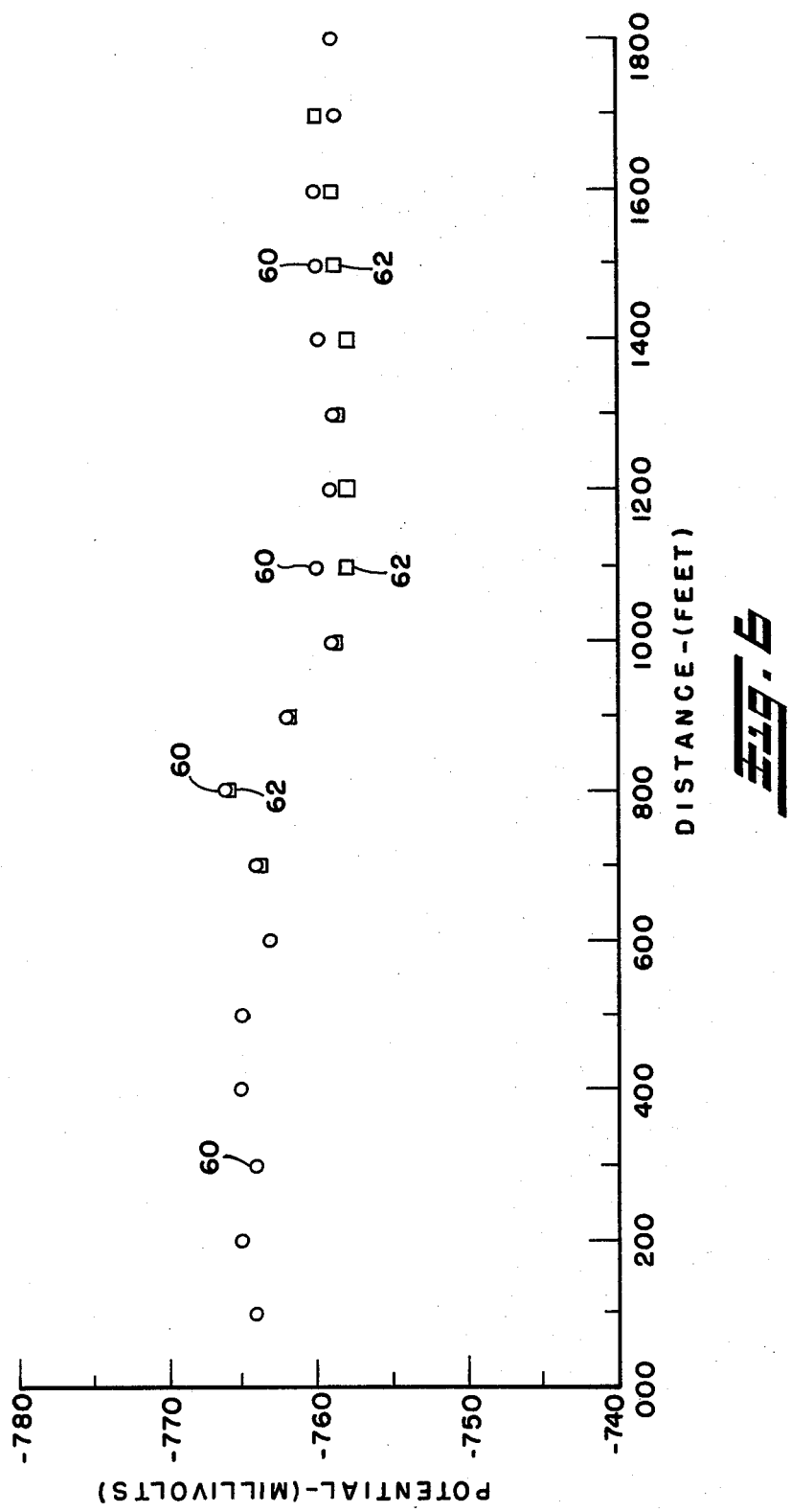

ELECTRICAL SURVEYS OF UNDERWATER OR UNDERGROUND STRUCTURES WITH ELECTRODE-TO-ELECTROLYTE POTENTIAL CORRECTION

DISCLOSURE

This invention relates generally as indicated to electrical surveys of underwater or underground structures.

BACKGROUND OF THE INVENTION

More particularly this invention relates to certain improvements in surveys of the type disclosed and claimed in prior U.S. Pat. No. 4,515,458 to William H. Seager, entitled "Closely Spaced Pipe-to-Soil Electrical Survey, Method and Apparatus", and U.S. Pat. No. 4,228,399, to Frank E. Rizzo et al, entitled "Offshore Pipeline Electrical Survey Method and Apparatus". Such prior patents are incorporated herein by reference.

The surveys of such prior patents are used throughout the world and are conducted by Harco Corporation of Medina, Ohio under the service mark CPL, which is an acronym for computerized potential log. Such surveys utilize a relatively fine lightweight wire which is economically disposable. While it is such wire which makes the surveys ecnomically advantageous, such wire can also cause problems due primarily to its very lightweight nature. Such problems are caused by line breakage. Offshore, a tuna trawler or other boat may cross the survey causing line breakage. Breakage can also be caused even by fish or rather easily bad weather. Offshore, when a wire break occurs it is essentially impossible to locate the break and the survey must generally be started over. This can add hours or even days to a survey project which can be very costly if a substantial crew and expensive equipment is involved.

Onshore, breakage can be caused by children playing along the right-of-way, cows, tractors or other vehicles, particularly if the survey crosses a highway. With such breakage the only prior solution was to find the break and repair it or start over. Both expedients cause obvious economic problems particularly if there is a substantial gap caused by the break. Moreover, the wire may break again before the survey can be restarted.

There are also situations during a survey when the surveyor knows that a break is about to occur. Therefore, the surveyor may wish to initiate a disconnect. A typical example offshore would be during rough weather or when a vessel can be sighted about to cross the path of the survey. If onshore, such situations may exist as the result of obstacles such as highways, railroads, or rivers. It may also occur where the surveyor may wish to initiate the survey the next day from a given location or reference point such as the edge of a field. Accordingly, it would be highly advantageous to be able to conduct surveys as shown in the above patents which can be continued in the event of wire line breakage when accidental or intentional.

SUMMARY OF THE INVENTION

With the present invention the survey is initiated as in the noted patents. The wire is electrically connected to the structure. Onshore, the wire may be connected to a test station, offshore, the wire may be connected to the structure onshore or to an offshore platform, for example. The wire supply together with a meter, recording or navigational equipment, and a reference electrode is moved along the structure to obtain periodic readings. Onshore, the reference cell is simply placed on the ground along the right-of-way. Offshore, the cell is towed submerged adjacent the mud line above the structure.

However, when a wire break occurs, either accidentally or intentionally, instead of trying to fix the break, a stationary cell or electrode is positioned at or before the last valid reading obtained or measured in the structure-to-electrolyte survey. The free end of the wire from the supply is then attached to the cell either before or after the cell is positioned, and the survey then proceeds as though no break had occured. The wire is then connected to the fixed electrode while the moving cell continues along the structure.

It will be appreciated that the readings initially obtained in the continuing electrode-to-cell survey will start with zero since the two cells are initially adjacent each other. Continued readings then fluctuate above and below zero. In order to obtain a final potential profile of the structure, calculations must be made to derive the comparable reading from the cell-to-cell potentials obtained. The calculated reading can readily be obtained by adding the last recorded pipe-to-electrolyte reading at the location of the stationary cell to each of the recorded cell-to-cell potentials. The recorded and calculated pipe-to-electrolyte potential measurements can then be plotted against down line distances to obtain a potential profile.

It is accordingly a principle object of the present invention to provide certain improvements in electrical surveys utilizing economically disposable lightweight wire which will permit those surveys to continue in spite of accidental or intentional line breakage.

Another principle object of the present invention is the provision of such surveys which may be initiated utilizing electrical contact with the structure and which may be concluded without such contact.

A further important object is the provision of such surveys which may be concluded with a simplified cell-to-cell survey with the results obtained being quickly converted to provide a reliable electrical profile of the structured surveyed.

Another object is the provision of a survey which may be done partly with direct electrical contact with the structure, partly on a cell-to-cell basis with the readings of the latter being readily computer corrected to assimilate with the former to provide a meaningful graphical electrical profile of the structure being surveyed.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a broken perspective view illustrative of a prior art survey method for surveying buried structures onshore;

FIG. 2 is a similar view of the prior art as utilized for surveying buried or submerged structures offshore;

FIG. 3 is a view similar to FIG. 2 but illustrating the survey continuing in accordance with the present invention after its initiation as in FIG. 1;

FIG. 6 is a partial illustration of a pipe-to-electrolyte potential profile made to obtain comparisions between the actually measured potentials versus the potentials calculated from cell-to-cell potentials.

DESCRIPTION OF THE PRIOR ART

Figure 4:
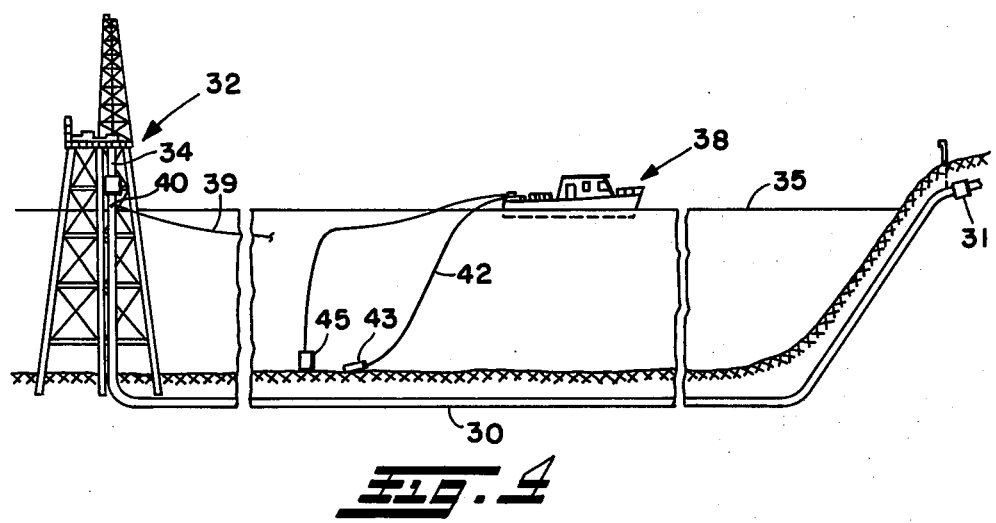
FIG. 4 is a view similar to FIG. 3, but illustrating the survey according to the present invention and continuing offshore as initiated in FIG. 2.

Referring first to FIG. 1, there is illustrated apparatus indicated generally at 10 for practicing a method of making closely spaced pipe-to-soil potential measurements such as shown in prior U.S. Pat. No. 4,151,458. A pipeline or like buried structure 11 is in a soil environment 12 along the right-of-way of which a surveyor 14 is traversing carrying the apparatus 10.

An elongate electrical conductor or wire 16 is electrically and mechanically connected to the pipe 11 at a reference location, preferably a test lead station 17 which is usually one of several installed at locations along the pipe spaced at one to two mile intervals. The connecting wire is of relatively light weight so that it may easily be carried by the surveyor. The wire is stored in unit 18 from which it is played out behind the surveyor 14 as he traverses the ground over the length of the pipeline.

The reference electrode 20, such as a conventional copper-copper sulfate half cell, is used for contacting the soil 12 proximate the pipe, and ideally directly over the pipe. The reference electrode may be mounted on the lower end of a cane 21 held by the surveyor for ease in contacting the ground. A meter 22, preferably a high input resistance type volt meter, may be provided on the cane and electrically connected to the half cell 20 to measure the potential difference between the wire 16 connected to the pipe and the reference electrode 20. The electrical connection with one terminal of the meter may be provided by a lead 23 on the cane to the reference electrode 20. The other terminal is connected via a lead wire 24 to the unit 18 which lead is electrically connected to the wire 16 through its support spool in the unit 18.

As indicated, the wire 16 may be light weight and economically disposable although it may be retrieved from the right-of-way for salvage or environmental purposes. As the survey progresses, the wire is played out behind the surveyor and at spaced intervals the surveyor may then record the potential difference and location by any of a variety of methods. One such method is to transmit the data by transmitter 26 to a remote system or tape recorder.

In FIG. 2 there is illustrated a prior art offshore survey which includes a buried structure or pipeline 30 extending, for example, from an onshore connection 31 to an offshore platform 32. The pipeline may serve as part of a gathering system for offshore wells, one or more of which may be positioned on several platforms in the area. The pipe includes a riser 34 extending above the sea surface 35. The pipe 30 may be buried just below the mud line 36 on the sea bottom, or it may be laid directly on top of the bottom.

The survey is conducted from a boat 38 or similar vessel and includes a lightweight economically disposable wire 39 which is electrically connected to the riser 34 at 40. The wire may be connected to the riser through a heavier lead, for example, since there is usually heavier wave action or vessel activity around the platform. The boat 38 includes the reels of wire, the meter and other equipment for navigational and communication purposes. The wire 39 may be similar to the wire 16 but of somewhat heavier gage and provided with a special coating to minimize holidays. The wire is connected through the reel on the vessel 38 to the meter and from the meter to line 42 which is electrically connected to cell 43. The cell or electrode 43 may be a conventional silver-silver chloride half cell which is weighted to pass proximate the pipeline 30.

The survey is conducted by first locating the pipe. This may be done by various navigational aids. Since submerged pipelines tend to move, it may be preferred that the pipeline first be located such as with the use of a marine magnetometer or other pipe locating device. A magnetometer sensor may be towed across the pipeline at certain intervals and then markers may be placed laterally offset from the points where the magnetometer indicates the pipeline to be, thus making it possible for the survey vessel to track the line. As the vessel 38 proceeds along the track the wire 39 is played out behind the vessel and the potential readings are taken and recorded periodically. The spacing of the readings may, of course, vary. Onshore, the readings may be taken every two and one-half feet, for example, while offshore, typically the readings may be taken every hundred feet. In either event, considering the length of the survey, the readings would be considered closely spaced.

Reference may be had also to the following copending U.S. applications indicating certain survey techniques and improvements with which the present invention may be utilized: Joseph W. Rog et al, Ser. No. 017,180, filed Mar. 5, 1979, now U.S. Pat. No. 4,322,805, for "Electrical Survey Method and Apparatus"; and Joseph W. Rog et al, Ser. No. 972,041, filed Dec. 21, 1978, now abandoned, for "Electrical Survey with Automatic Distance Measuring".

DESCRIPTION OF THE PREFERRED EMBODIMENTS

Referring now to FIG. 3, in the event breakage of the wire 16 occurs, either accidentally or intentionally, for any of the aforementioned reasons, the surveyor 14 returns to or before the position of his last valid reading with the direct wire connection and places in the ground stationary electrode 28. Since it may not be readily apparent to the surveyor from the readings obtained precisely when the wire break occured, the surveyor may wish to back-track several locations to select a location to ensure the stationary electrode is at a location where a valid reading was obtained.

The electrode 28 may be copper-copper sulfate as the electrode 20, or a silver-silver chloride electrode, for example. It may include an angle, step or other structural feature enabling the surveyor to quickly and conveniently drive it into the ground with the aid of his foot, and the broken or disconnected free end of the wire 16 extending from the reel carried in the unit 18 may readily be connected thereto. The survey then continues. The electrode 28 may also be economically disposable as is the wire and need not necessarily be retrieved.

Should the wire 16 break again, either intentionally or accidentally, a further electrode 28 may be implanted in the right-of-way at the last valid reading obtained, the free end of the wire from the spool again connected thereto. This process may be repeated several times if required.

Referring now to FIG. 4, if offshore a wire breakage occurs either accidentally or intentionally, the free end of the wire 39 from the spool or reel on the vessel 38 is connected to a weighted cell or electrode 45 which is dropped at or before approximately the last position where a valid recorded reading is obtained with the direct connection. The survey then continues as a cell-to-cell survey.

Figure 5:
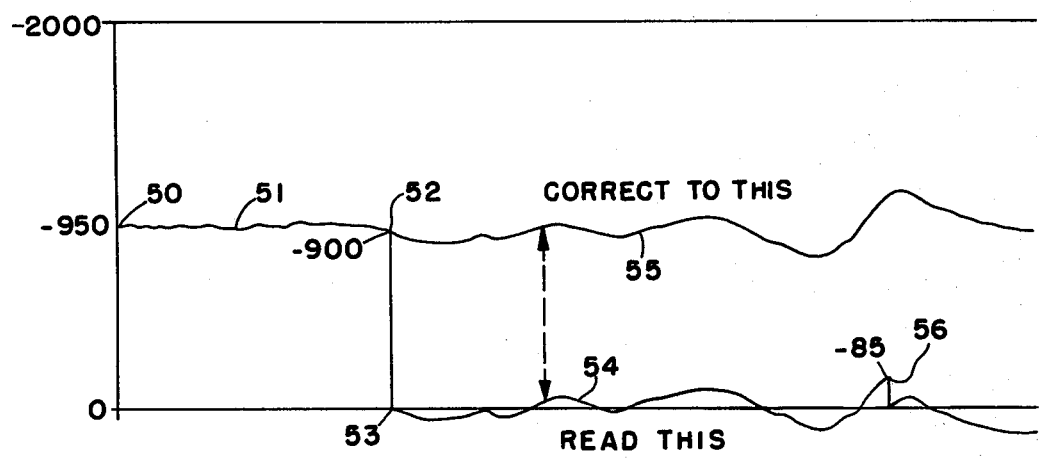
FIG. 5 is a graph illustrating the readings obtained with a survey according to the present invention and the corrections made to obtain a structure profile.

Referring now to FIG. 5, as soon as the wire is attached to the stationary cell 28 or 45, with the moving and stationary cells adjacent each other, the reading obtained would be zero. As the cell-to-cell continues, the readings then fluctuate above and below zero. Accordingly, a correction is required to provide a meaningful pipe-to-electrolyte potential profile.

As seen in FIG. 5, the abscissa of the graph represents the distance along the survey while the ordinate represents the measured or calculated potential in millivolts. The survey may start at the point 50 and the actual measured pipe-to-electrolyte potentials may fluctuate along the curve 51 to the point 52 at which wire breakage occurs. At such point, for example, the measured potential may be minus 900 millivolts. Thereupon a stationary electrode is located and the survey continues with the cell-to-cell survey providing the potential readings indicated by the curve 54. As indicated the curve fluctuates above and below zero. Therefore, in order to provide a meaningful continuation of the curve 51, a correction is required, and to each reading obtained beyond the point 53 the correction is simply the summing of the direct measured reading obtained at the point 52, namely, minus 900 millivolts. In this manner, the corrected curve is shown beyond the point 52 at 55.

If wire breakage occurs again in the cell-to-cell survey, a further stationary electrode may be positioned along the survey and the summation or correction applied is thereafter the sum of the reading shown at 56 and the original reading shown at 52. Assuming the reading at 56 is minus 85 millivolts, as indicated, the summing correction would be minus 985 millivolts.

It will be appreciated that during the survey the readings may be obtained without the corrections or calculations being applied, notations simply being made concerning the amount of correction required and where the correction is required. Other notations can be made along the survey such as with reference to locations, markers or other physical conditions. After the notations are recorded, the notations may be computer corrected to provide a meaningful pipe-to-electrolyte potential profile of the pipeline.

Specific Example—FIG. 6

With reference to FIG. 6, the ordinate again is expressed in potential measurements or negative millivolts while the abscissa is expressed in distance or feet. The test represented by the graph of FIG. 6 was conducted to compare direct measured potentials versus those potentials calculated from a continuing cell-to-cell survey in accordance with the present invention.

The survey was performed utilizing the Harco CPL survey method while simultaneously performing a stationary cell-to-moving cell potential survey in accordance with the present invention. The test was conducted on an offshore pipeline and a silver-silver chloride reference electrode was towed above the pipe while maintaining the test connection to the pipe by spooling out the economically disposable wire from a boat moving at approximately two knots. The pipe-to-electrolyte potential was measured using a high impedence voltmeter (10 meg. ohm) and was recorded at 100 foot intervals along the entire length of the pipeline. The measurements were made with the test leads to the pipe connected to the negative terminal of the voltmeter and with the reference electrode connected to the positive terminal of the voltmeter.

The stationary cell-to-moving cell potential survey was performed simultaneously with the pipe-to-electrolyte survey except for the initial 700 feet of the pipeline. After the survey had progressed approximately 700 feet down the line, the survey vessel was stopped and a silver-silver chloride reference electrode was installed at the mud line near the pipeline. The lead to this reference electrode was spliced to another spool of such economically disposable wire which was in turn electrically connected to the negative terminal of a high impedence voltmeter (10 meg. ohm). The positive terminal of the voltmeter was connected to the reference electrode being used for the pipe-to-electrolyte potential measurement. Thus, the moving or towed electrode was common to both the pipe-to-electrolyte potential measurement and the electrode-to-electrode potential measurement. Both measurements were recorded at the point where the stationary electrode was installed. Both electrode-to-electrode and pipe-to-electrolyte measurements where recorded simultaneously at 100 foot intervals along the pipeline.

The pipeline was located prior to the survey moving a marine magnetometer across the pipeline with markers offset from the points where the magnetometer indicated the pipeline to be, thus permitting the vessel to track the line.

The pipe-to-electrolyte potential values are shown at 60 as circular dots in FIG. 6, while the pipe-to-electrolyte values calculated from the electrode-to-electrode potential measurements are shown at 62 as square dots. In order to calculate the pipe-to-electrolyte potentials from electrode-to-electrode potentials, the following simple formula was used:

$$P/E_{cx} = P/E_{ro} + E/E_{rx}$$

where $P/E_{cx}$ is the calculated pipe-to-electrolyte at a downline distance of "x", $P/E_{ro}$ is the recorded pipe-to-electrolyte at the origination point of the E/E potential run which in the indicated graph of FIG. 6 is 700 feet downline, and the $E/E_{rx}$ is the recorded electrode-to-electrode potential at downline distance "x". The recorded and calculated pipe-to-electrolyte measurements are plotted with the downline distances.

Although FIG. 6 indicates only partially the data obtained, an examination of the data presented in one of the two runs of the test survey indicates that of 105 points where both P/E (pipe-to-electrolyte) and E/E (cell-to-cell) potentials were recorded that the following correlation existed between recorded and calculated potential values: 37% of all calculated values were the same as the recorded value, 80% of all calculated values were within plus or minus 1 mv. of the recorded value, 91% of all calculated values were within plus or minus 2 mv. of the recorded value; 97% of all calculated values were within plus or minus 3 mv. of the recorded value; and 100% of all calculated values were within plus or minus 4 mv. of the recorded value. A study of the second run also showed excellent correlation between the calculated and recorded pipe-to-electrolyte potential values. In the second run 60% of the calculated potential values were within 1 mv. of the recorded potential, 89% were within 2 mv. and 100% were within 4 mv. of the recorded value.

We claim:

1. A method of conducting an electrical survey of a buried structure along the route thereof comprising the steps of electrically connecting one end of a wire to an electric potential sensing cell, securing a stationary reference electrode at a location along the route of the survey with one end of economically disposable wire from a wire supply connected to such electrode, moving the cell along the structure while playing out the economically disposable wire, at plural locations along the structure periodically obtaining measured electrode-to-electrolyte potential values, obtaining a measured structure-to-electrolyte potential value, and correcting such electrode-to-electrolyte potential values utilizing such measured structure-to-electrolyte potential value.

2. A method as set forth in claim 1 wherein the structure is underwater, and the stationary electrode is anchored underwater, proximate the structure.

3. A method set forth in claim 1 wherein the structure is underground, and the stationary electrode is secured on or in the ground above the structure.

4. A method as set forth in claim 1 including the step of securing a second stationary electrode along the survey after the economically disposable wire is again intentionally or accidentally disconnected with the economically disposable wire from the supply connected to such second stationary electrode, and continuing the survey as aforesaid.

5. A method as set forth in claim 4 including the step of utilizing the last valid measured potential value when the wire was connected to the structure, and the last valid potential value obtained when the economically disposable wire was connected to the first mentioned stationary electrode to correct the potential values obtained using the second stationary electrode.

6. A method as set forth in claims 4 or 5 including repeating the steps recited utilizing a third or more stationary electrodes.

7. A method as set forth in claim 1 wherein the step of correcting the potential values comprises the step of calculating theoretical values by adding said last selected potential value to the value obtained with the stationary electrode.

8. A method as set forth in claim 7 wherein the calculation is performed by a computer after the survey is complete.

9. A method as set forth in claim 8 wherein the measured and calculated readings are combined to provide a structure-to-electrolyte potential profile.

10. A method as set forth in claim 1 wherein the buried structure is an underwater or underground pipeline.

11. A method as set forth in claim 10 wherein the measured structure-to-electrode values are obtained by a meter.

12. A method as set forth in claim 11 wherein the meter is adjacent the cell and supply, with all three being moved along the strucutre.

13. A method of conducting an electrical survey of a buried structure along the route thereof comprising the steps of connecting one end of an economically disposable wire from a wire supply to the structure, electrically connecting a wire to an electric potential sensing cell, moving the cell along the structure while playing out the economically disposable wire, at plural locations along the structure periodically obtaining measured structure-to-electrolyte potential values, the improvement comprising after an accidental or intentional disconnecting of the economically disposable wire occurs as the survey is being carried out at a location along the route of the structure, placing a stationary electrode approximately at or slightly before such location with the economically disposable wire from the supply connected to the electrode, and then continuing the survey along the route of the structure by playing out such economically disposable wire and periodically obtaining electrode-to-cell potential values.

14. A method as set forth in claim 13 including the step of calculating values from the electrode-to-cell potential values to be used with the measured structure-to-cell values to provide a structure-to-electrolyte potential profile.

15. A method as set forth in claim 14 wherein the structure is underwater, and the stationary electrode is anchored underwater, proximate the structure.

16. A method as set forth in claim 14 wherein the structure is underground, and the stationary electrode is secured on or in the ground above the structure.

17. A method as set forth in claim 14 including the step of securing a second stationary electrode along the route of the structure after the wire is again intentionally or accidentally disconnected with the wire from the supply connected to such second stationary electrode, and continuing the survey as aforesaid.

18. A method as set forth in claim 17 including the step of utilizing the last valid measured potential value when the wire was connected to the structure, and the last valid potential value obtained when the wire was connected to the first mentioned stationary electrode to correct the potential values obtained using the second stationary electrode.

19. A method as set forth in claims 17 and 18 including repeating the steps recited utilizing a third or more stationary electrodes.

20. A method as set forth in claim 14 wherein the step of calculating comprises adding the last valid measured structure-to-electrolyte potential value to the electrode-to-cell potential values.

21. A method as set forth in claim 20 wherein the calculation is performed by a computer after the survey is complete.

22. A method as set forth in claim 13 wherein the buried structure is an underwater or underground pipeline.

23. A method as set forth in claim 13 wherein the measured structure-to-electrode values are obtained by a meter.

24. A method as set forth in claim 23 wherein the meter is adjacent the cell and supply, with all three being moved along the structure.

25. A closely spaced electrical survey of an underwater or underground structure along the route thereof comprising the steps of electrically connecting an economically disposable wire from a supply thereof to the structure, electrically connecting a second wire to an electric potential sensing reference cell moving said reference cell along the route of the structure, while playing out the wire therealong, and measuring the potential difference between the structure and reference cell at closely spaced intervals, the improvement comprising after the disconnecting of the wire either intentionally or accidentally, then placing a stationary cell adjacent the structure with such economically disposable wire from such supply thereof reconnected to such cell, and again moving the reference cell along the structure while playing out the economically disposable wire and at plural locations along the structure obtaining closely spaced cell-to-cell potential difference measurements.

26. A method as set forth in claim 25 including the step of correcting the measurements in the cell-to-cell survey obtained to correspond to those obtained with the wire connected to the structure.

27. A method as set forth in claim 26 wherein the step of correcting comprises summing each of the cell-to-cell measurements with the last valid recorded cell-to-structure measurement.

28. A method as set forth in claim 1, further comprising before carrying out said steps of securing a stationary reference electrode and of obtaining measured electrode-to-electrolyte potential values, initiating the survey by carrying out said step of obtaining a measured structure-to-electrolyte potential value, including electrically connecting one end of an economically disposable wire from a wire supply to the structure, moving the electric potential sensing cell along the structure while playing out the economically disposable wire, at plural locations along the route of the pipeline periodically carrying out said obtaining of measured structure-to-electrolyte potential values, and then after the occurrence of a disconnection or break in such economically disposable wire continuing such survey by carrying out said steps of securing of a stationary reference electrode at a location along the route of the survey, said securing including securing such reference electrode where the last selected valid structure-to-electrolyte potential value was obtained; and said correcting comprising correcting the electrode-to-electrolyte potential values utilizing in such correction the last selected valid structure-to-electrolyte potential value obtained when the economically disposable wire was connected to the structure.

* * * * *